United States Patent [19]

Eichinger

[11] Patent Number: 4,515,573
[45] Date of Patent: May 7, 1985

[54] DIFFERENTIAL COUPLING

[75] Inventor: Johann Eichinger, Vaterstetten, Fed. Rep. of Germany

[73] Assignee: Carl Hurth Maschinen- und Zahnradfabrik GmbH & Co., Munich, Fed. Rep. of Germany

[21] Appl. No.: 576,641

[22] Filed: Feb. 3, 1984

Related U.S. Application Data

[63] Continuation of Ser. No. 312,070, Oct. 16, 1981, abandoned.

[30] Foreign Application Priority Data

Dec. 24, 1980 [DE] Fed. Rep. of Germany ....... 3049054

[51] Int. Cl.³ ............................................... F16C 1/02
[52] U.S. Cl. ..................................... 464/69; 105/131; 464/71
[58] Field of Search ................... 105/131; 464/69, 81, 464/147, 71

[56] References Cited

U.S. PATENT DOCUMENTS

| | | | |
|---|---|---|---|
| 1,948,473 | 2/1934 | Marshall | 105/131 |
| 2,360,521 | 10/1944 | Sheppard | 105/131 |
| 2,404,115 | 7/1946 | Williams | 105/131 |
| 2,412,853 | 12/1946 | Alben | 105/131 |
| 2,664,003 | 12/1953 | Nixon | 105/131 X |

FOREIGN PATENT DOCUMENTS 1210204 10/1970 United Kingdom ............... 105/131

Primary Examiner—Randolph Reese
Attorney, Agent, or Firm—Flynn, Thiel, Boutell & Tanis

[57] ABSTRACT

A joint coupling, in particular for transmitting the motor output in electrically driven rail vehicles to a drive axle, includes a hollow shaft which is provided on a frame or bogie, and the drive axle is enclosed by the hollow shaft and is arranged radially movably with respect thereto. Each of two linkage elements are hingedly connected both to a first flange member which is rigidly connected to the hollow shaft and also to a second flange member which is connected rigidly to the drive axle. The linkage elements are each with their free ends hingedly connected to an intermediate member which surrounds the drive axle and is radially movable with respect thereto. The intermediate member is divided into two halves in a direction transversely to its axis and the axis of the drive axle, which halves are connected releasably to one another.

1 Claim, 4 Drawing Figures

DIFFERENTIAL COUPLING

This application is a continuation of U.S. Ser. No. 312,070, filed Oct. 16, 1981, now abandoned.

FIELD OF THE INVENTION

The invention relates to a flexible joint coupling.

BACKGROUND OF THE INVENTION

A known joint coupling arrangement is shown and described in U.S. Pat. No. 4,148,262. A further known joint coupling is known from British Pat. No. 1,210,204 and has proven to be acceptable in use. A disadvantage is sometimes observed in the driving wheel and a flange member which engages the drive axle having to be removed from the drive axle during servicing operations on the intermediate member.

Therefore, the basic purpose of the invention is to improve the joint coupling so that installation and removal thereof is made easier.

The purpose is attained by the intermediate member being divided into two halves in a direction transversely with respect to its axis, which two halves are releasably connected to one another. In this manner, it is possible to subsequently install or separately remove the intermediate member and the linkage element. In other words: the transmission with the first flange member can be moved onto the drive axle, then the second flange member and the driving wheels can be secured on the drive axle and only then the intermediate member with the linkage element is installed. During a repair, it is possible to remove the intermediate member with the linkage elements by themselves without a time-consuming removal of other structural parts. That is, the drive axle with transmission housing and motor remain built into the vehicle.

BRIEF DESCRIPTION OF THE DRAWINGS

The invention will be discussed with reference to one exemplary embodiment which is illustrated in FIGS. 1 to 4.

DETAILED DESCRIPTION

Figure 2:
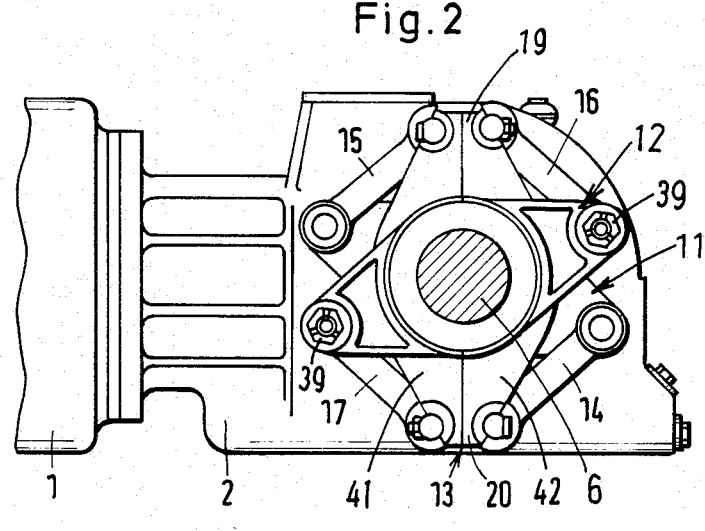
FIG. 2 is a cross-sectional view taken along the line II—II of FIG. 1.
Figure 1:
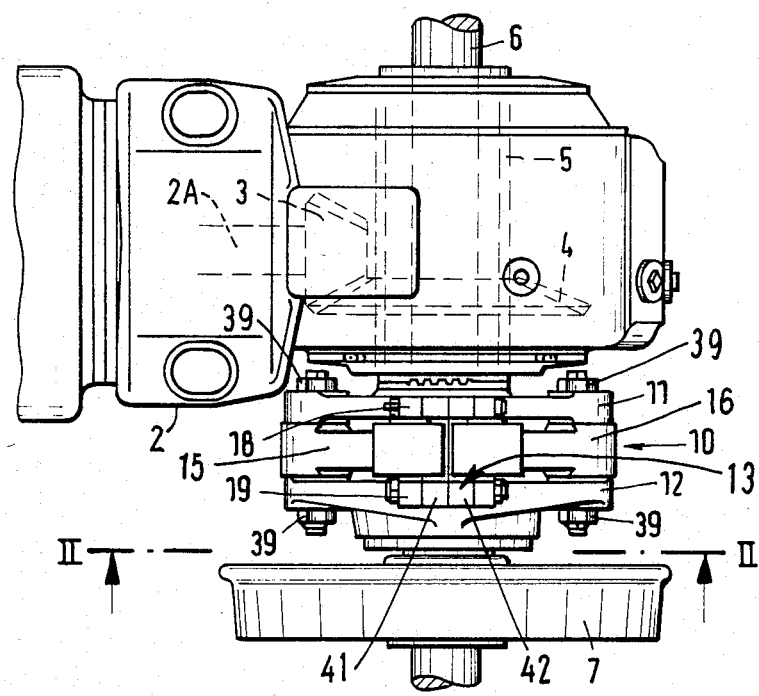
FIG. 1 is a side view of an electric motor drivingly coupled to a drive axle of a rail vehicle through a transmission shaft housing and a differential coupling. The electric motor and the drive axle are only partially illustrated.

The important drive elements of a rail vehicle are illustrated in FIGS. 1 and 2. An electric motor 1 is supported in a spring-suspended frame or bogie (not illustrated) of a rail vehicle, which motor drives a transmission shaft 2A located within a transmission shaft housing 2. The transmission housing 2 is connected by a flanged coupling to the electric motor. A pinion gear 3 is fixedly connected to the transmission shaft 2A and is rotatably driven by the electric motor. The pinion gear 3 engages a bevel gear 4 fixedly secured to a rotatably supported hollow or sleevelike drive shaft 5 extending transversely with respect to the direction of travel and the transmission shaft 2A. A drive axle 6 is approximately centrally disposed in the hollow shaft 5 with a radial spacing to accommodate a spring movement of the spring mass. A pair of driving wheels 7 are mounted at the opposite ends of the drive axle 6.

The driving connection from the hollow shaft 5 to the drive axle 6 includes a flexible joint coupling 10. The coupling 10 has a first flange member 11 fixedly connected to the hollow shaft, a second flange member 12 fixedly connected to the drive axle and an intermediate member 13 hingedly connected to and extending therebetween. More specifically, the first flange member 11 is hingedly connected through two linkage elements 14, 15, to the intermediate member 13. The second flange member 12 is hingedly connected through two linkage elements 16, 17 to the intermediate member 13. Thus, a four-link connection consisting of the first flange member 11, the linkage elements 14, 15 and the intermediate member 13 is formed. A further four-link connection consists of the intermediate member 13, the linkage elements 16, 17 and the second flange member 12. In particular, and as evident from FIG. 3, the intermediate member 13 has an opening 13A therethrough which has a diameter greater than that of the drive axle 6, the drive axle 6 extending through the opening 13A. Since the intermediate member 13, which is the common member joining together the two four-link connections, is not supported on the hollow shaft 4 or the drive axle 6 and can thus be said to be floating, the coupling can balance out the radial movements between the sprung mass and the unsprung mass.

The intermediate member 13 has two bifurcated extensions at diametrically spaced locations relative to the axes of the hollow shaft and drive shaft, with each bifurcation receiving the ends of a pair of linkage elements therein. The legs of the one of the bifurcated ends are identified by reference numerals 18, 19 in FIG. 1. Only one leg 20 is shown in FIG. 2. Each leg has adjacent the outer end thereof a pair of axially spaced, approximately semicylindrical recesses 22, 23 (FIG. 3) for receiving pins 26 therein which are part of a rubber joint connection 24 (FIG. 4) to the linkage elements. Each of the joints 24 are oriented on a lateral side of the intermediate member. Each rubber joint 24 consists of the pin 26 and an outer sleeve part 27 having a cylindrical outer contour. An elastic member is inserted under initial tension between the pin and the outersleeve part and is connected to the pin 26 to the outer sleeve part 27, for example by vulcanization. The pins 26 have holes therethrough and are connected together by screws 30, 31 and nuts 32, 33 in pairs on the intermediate member so that the pins 26 can be removed in a radial direction from the semi-cylindrical recesses 22, 23 following a release of the screw-nut pairs.

As stated above, the linkage elements 14, 15 are connected at their ends remote from the intermediate member 13 to the first flange 11. The linkage elements 16, 17 are similarly connected to the second flange 12. Rubber joints are provided at these locations and consist each of a pin 36 and an outer sleeve part 37 having a cylindrical outer contour. An elastic member, here a rubber sleeve 38, is inserted under initial tension between the pin 36 and sleeve 37 and is connected thereto, as for example by vulcanization. The pins 36 have a conical extension 40 which extends into a corresponding opening of a respective flange member and are secured thereto by a nut 39. Following a releasing of the nuts 39, the pins 36 can be removed axially from the respective flange member.

The structure of the rubber joints 24, 25, 34, 35 is not to be limited to the illustrated embodiments. It is to be recognized that other forms are also possible. An axial fixing of the outer parts 27, 37 in the linkage elements is accomplished by conventional, not illustrated means, as snap rings or the like.

The intermediate member 13 is divided into two parts or halves 41, 42 for easier installation and removal purposes, and the halves 41, 42 are held together by plural tight-fit screws 43, 44 and nuts 45, 46. An additional securement of the halves is achieved with the screws 30, 31 and nuts 32, 33. The two halves 41 and 42 and the linkage elements can be installed and removed independently from the remaining parts of the drive. Their exact position to one another is fixed by the tight-fit screws 43, 44, so that other centering devices, such as adjusting springs etc., are not needed. An important function of the screws 43 and 44 is to substantially prevent deformation of the halves 41 and 42 of the intermediate member 13 in response to operational forces exerted by the linkage elements 14-17 during operational use, especially in the region of the opening 13A.

Figure 3:
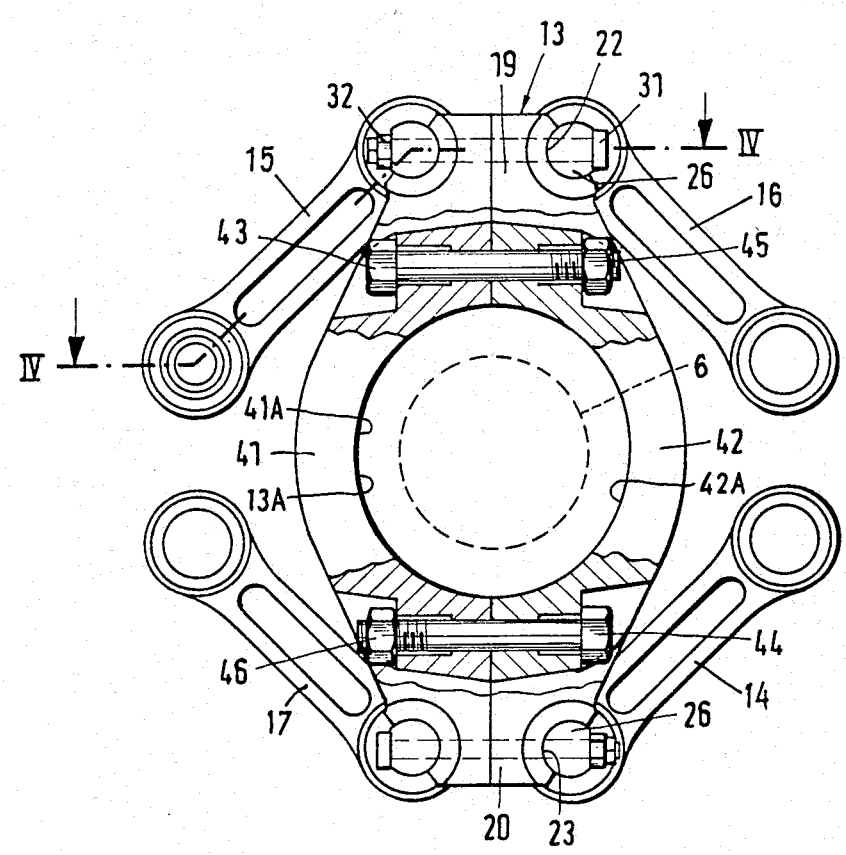
FIG. 3 illustrates in an enlarged scale the intermediate member and the linkage means of the inventive coupling.
Figure 4:
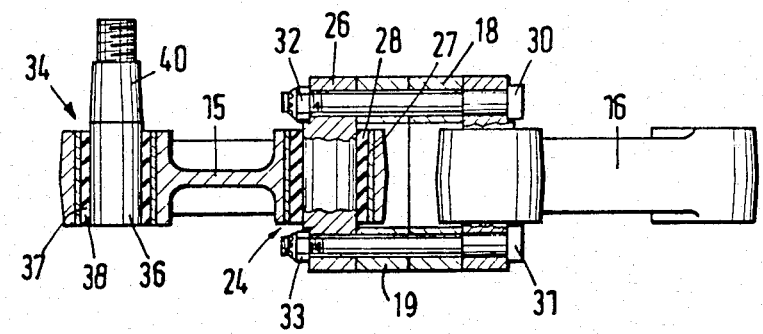
FIG. 4 is a partial cross-sectional view taken along the line IV—IV of FIG. 3.

As shown in FIG. 3, the intermediate member 13 is divided into the two halves 41 amd 42 along a plane which extends radially and axially of the drive axle 6 and substantially bisects the axle 6 and the opening 13A. The halves 41 and 42 each have respective inwardly facing semi-cylindrical surfaces 41A and 42A thereon which define the opening 13A when the halves 41 and 42 are secured to each other.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a drive arrangement which includes: a rotatably supported drive axle; a drive sleeve provided around said drive axle approximately coaxial therewith and supported for rotation independently thereof, said drive sleeve having an inner diameter which is substantially larger than the outer diameter of said drive axle, and said drive sleeve and drive axle being supported for radial movement relative to each other; and joint coupling means for operatively coupling said drive sleeve and said drive axle, said joint coupling means including radially extending first flange means on said drive sleeve, radially extending second flange means on said drive axle, a floating intermediate member having an opening therethrough which has an inner surface and has a diameter substantially larger than that of said drive axle, said drive axle extending through said opening in said intermediate member, first and second link elements which each have one end pivotally supported on said first flange means and a further end pivotally supported on said intermediate member at a location spaced radially outwardly from said opening therethrough, and third and fourth link elements which each have one end pivotally supported on said second flange means and a further end pivotally supported on said intermediate member at a location spaced radially outwardly from said opening therethrough, said further ends of said first and second link elements respectively being near said further ends of said third and fourth link elements; the improvement comprising wherein said intermediate member includes first and second parts which each have thereon a respective portion of said inner surface of said opening through said intermediate member, said intermediate member being divided into said first and second parts along a dividing plane which extends approximately radially and axially of said drive axle and which extends between said further ends of said first and third link elements and between said further ends of said second and fourth link elements, and wherein said intermediate member includes fastening means for releasably securing said first and second parts to each other, said fastening means including first and second bolts which extend through aligned openings in said first and second parts of said intermediate member approximately perpendicular to said dividing plane on diametrically opposite sides of and at locations spaced radially from said opening through said intermediate member, said first bolt being located in the region of said further ends of said first and third link elements and said second bolt being located in the region of said further ends of said second and fourth link elements, and said fastening means further including third and fourth bolts which extend through aligned openings in said first and second parts of said intermediate member approximately perpendicular to said dividing plane on diametrically opposite sides of and adjacent to said opening through said intermediate member, said third and fourth bolts substantially preventing deformation of said first and second parts of said intermediate member in response to operational forces applied to said intermediate member by said link elements during operational use of said drive arrangement.

* * * * *